Aug. 11, 1964    JEAN-CLAUDE DEBRAY    3,144,198
HIGH SPEED COMPRESSOR FOR LIGHTWEIGHT
VEHICLES REQUIRING PNEUMATIC SERVICE
Filed July 26, 1961    2 Sheets-Sheet 2

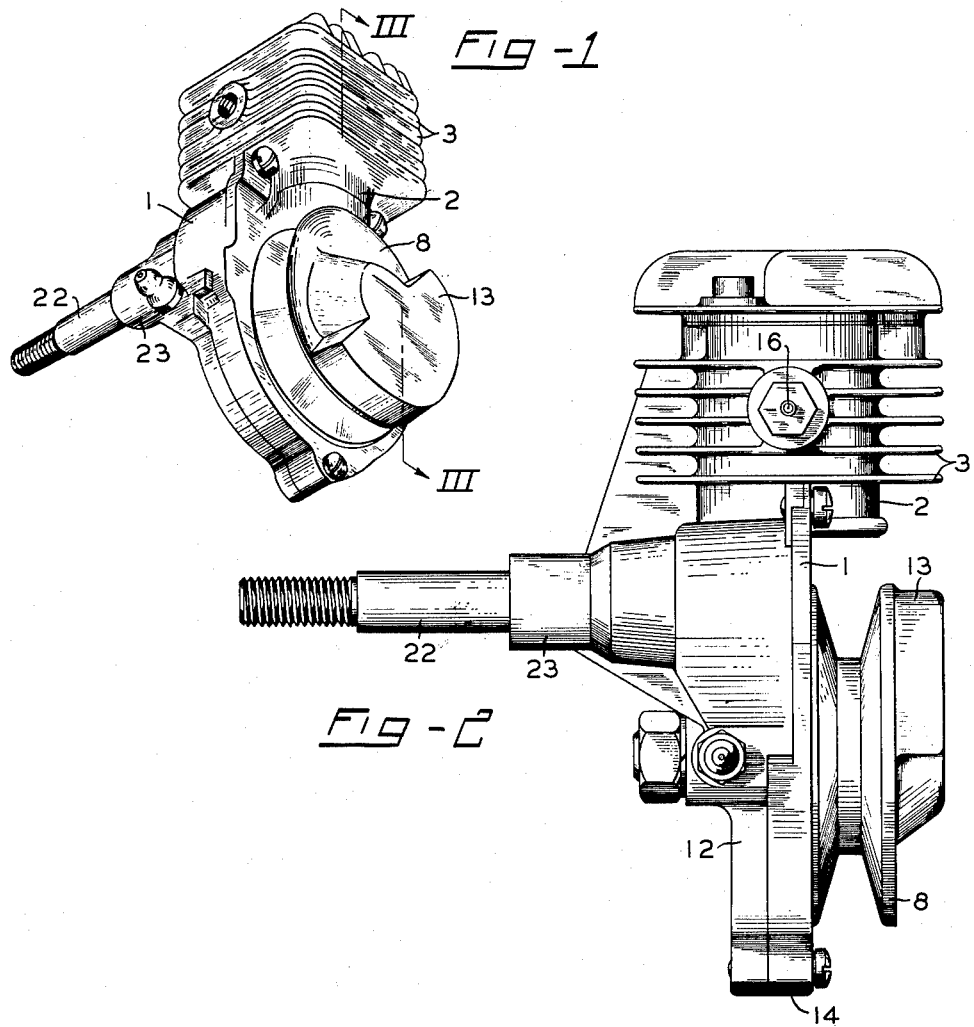

INVENTOR.
JEAN-CLAUDE DEBRAY
BY
ATTORNEY

United States Patent Office 3,144,198
Patented Aug. 11, 1964

3,144,198
HIGH SPEED COMPRESSOR FOR LIGHTWEIGHT
VEHICLES REQUIRING PNEUMATIC SERVICE
Jean-Claude Debray, Sarcelles, France, assignor to Compagnie des Freins et Signaux Westinghouse, Paris, France
Filed July 26, 1961, Ser. No. 127,029
Claims priority, application France Sept. 7, 1960
1 Claim. (Cl. 230—38)

This invention relates to air compressors and, more particularly to air compressors of the type employed in automobile and the like for providing pneumatic pressure to various pneumatically operated accessories installed in the automobile.

In an automobile it is oftentimes desirable to employ accessories requiring the use of a source of pneumatic pressure, such as, for example, in air springs, brakes, and the like. Heretofore, such pneumatically operated accessories generally have been rejected for use in automobiles because of the expense involved in constructing a suitable compressor. Furthermore, air compressors used for these automotive accessories must be relatively compact and when so constructed high speeds are required in order to obtain the desired air compression. With the more or less conventional reciprocating type compressor having movable intake and discharge valves operating in timed relationship to each other, such high speeds result in rapid wear of the inlet and discharge valves causing frequent breakdowns. Moreover, such intake and discharge valves have high inertia forces so that at high speeds the volumetric efficiency of the compressor rapidly decreases.

It is an object of the present invention to provide an air compressor overcoming the difficulties encountered heretofore.

It is a further object of the invention of provide an air compressor which eliminates the usual valves associated with the conventional compressor.

It is still a further object to provide an air compressor which is driven by the engine fan belt and which is constructed and attached to the engine so as to provide a tension means on the fan belt.

The compressor of the present invention comprises generally a cylinder in which there is reciprocably mounted a piston. Formed in the piston is a passageway arranged so as to open at one end on the side face thereof and at its other end on a lateral face thereof. Provided in the cylinder is a discharge port which is located so as to be aligned with the lateral opening of the passageway when the piston is at the top of its stroke. An intake port is provided on the face of the cylinder substantially opposite the discharge port and is located so as to be open when the piston is at its lower dead center position. The compressor is driven by the fan belt associated with the engine and is provided with a mounting means which is eccentric relative to the piston drive means so as to serve as a fan belt tension device.

Other objects in advantage to the invention will become apparent from the following more detailed description thereof taken with reference to the accompanying drawings wherein:

FIG. 1 is a perspective view of the compressor embodying the present invention.

FIG. 2 is a side elevational view of the compressor.

Figure 3:
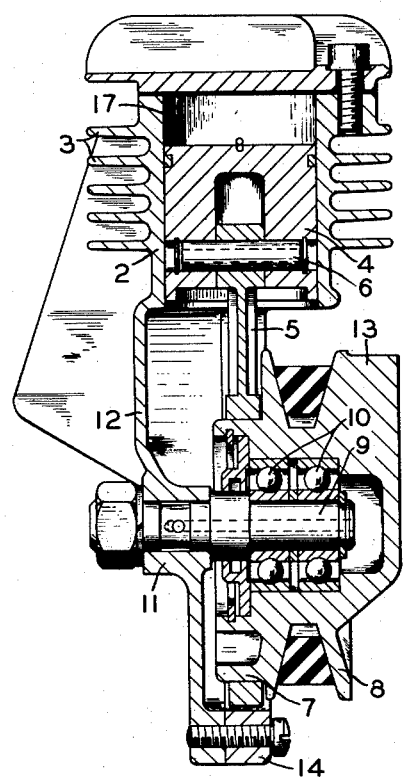
FIG. 3 is a cross-sectional side elevational view of the compressor taken through the lines III—III of FIG. 1.

Referring now to the drawings, the compressor comprises a frame or support 1 having formed at one end a cylinder 2 provided with a plurality of exterior cooling vanes 3. A piston 4 is mounted for reciprocation within the cylinder 2. The piston 4 is pivotally connected to the upper end of a piston rod 5 by way of a wrist pin 6. The other end of the piston rod embraces an eccentric portion 7 provided on one side of a pulley 8. The pulley 8 is suitably journaled for rotation about a shaft 9 by way of ball bearings 10 and is adapted to be driven by the engine fan belt. The shaft 9 is held fixed in a hub 11 provided on a flange 12 in form of a cover plate which depends from the cylinder 2. For balancing the pulley 8 there is formed on the exposed face thereof a counterweight 13. A front face plate 14 may be secured to the flange 12 to protect the shaft 9 and bearings 10.

Figure 4:
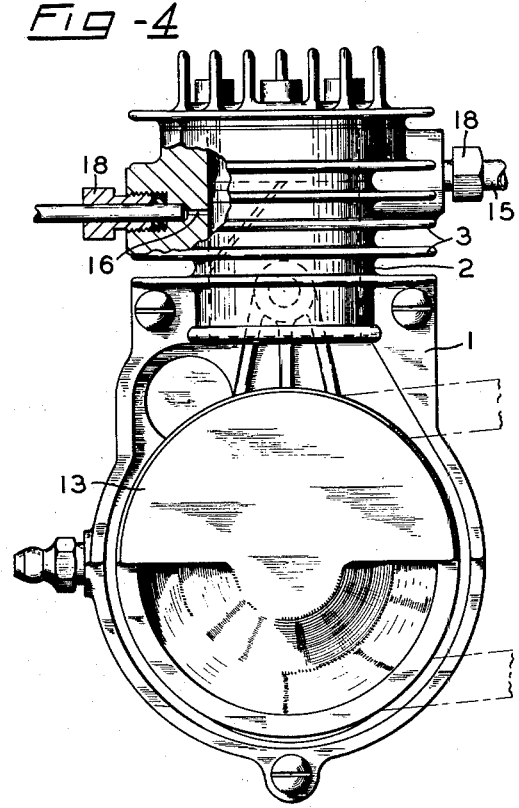
FIG. 4 is a front elevational view of the compressor with a section of the casing partially broken away to show underlying details of structure.

The cylinder is formed with an intake port 15 and a discharge port 16. The intake and discharge ports 15 and 16 are arranged at 180° with respect to each other and each port provides for communication between the cylinder bore 17 and the exterior of the cylinder. As shown in FIG. 4, the discharge port 16 is constructed so as to accommodate suitable fittings 18 for a pipe or conduit connecting the compressor to the auxiliary equipment to be actuated by pneumatic pressure generated by the compressor. Similar fittings may be provided at the intake port 15.

The piston 3 is provided with a diagonally extending internal passageway 19 of which one end 20 opens on the upper face of the piston and the other end 21 opens on the side face of the piston. The side opening 21 on the piston is located such that it aligns and communicates with the discharge or release port 16 on the side of the cylinder when the piston is at its top dead center position (see FIG. 7).

Figure 5:
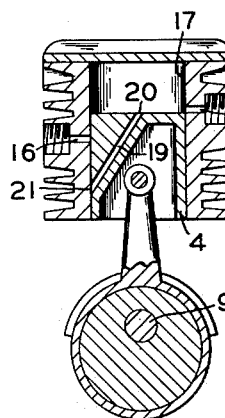
FIGS. 5 through 8 are diagrammatic cross-sectional views of the cylinder and piston of the compressor showing a location of the piston in the cylinder in its different operating positions.

The intake port 15 is located so that it is uncovered when the piston 3 is in its lower dead center position (see FIG. 5).

For mounting the compressor, there is provided a stud 22 of which one end is threaded into a hub 23 formed on the cover plate flange 12 and the other end is threaded to provided a convenient means for attachment to the engine block. It is to be observed that the stud 22 is located eccentrically with respect to the shaft 9 of the driving pulley 8 so that the weight of the compressor assembly is concentrated on one side of the stud and tends to cause a turning of the assembly thereabout. The compressor is mounted on the engine block with the stud 22 located more remote from the engine fan belt pulley than the pulley shaft 9 and is fastened on the block such that the weight of the compressor is applied as a tension means on the engine fan belt which is trained over the pulley 8. Advantageously, the compressor may be mounted adjacent the cooling fan of the engine so as to assure adequate cooling of the air in the compressor.

Figure 6:
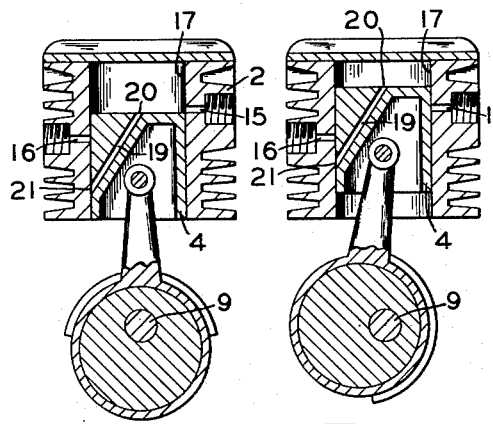
Figure 7:
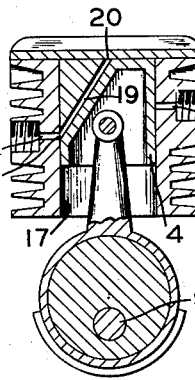
Figure 8:
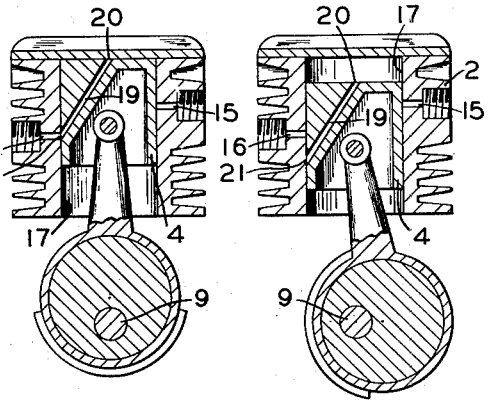

For a more complete understanding of the operation of the compressor, reference is made in FIGS. 5 through 8, in which FIG. 5 corresponds to the intake; FIG. 6 to the compression; FIG. 7 to the discharge; and FIG. 8 to the suction.

When the piston 3 is in the bottom dead center position as shown in FIG. 5, the intake port 15 provided in the cylinder wall is exposed so as to permit air to enter the cylinder at atmospheric pressure. As the piston 3 progresses upwardly from its bottom dead center position, the piston 3 cover the intake port 15 somewhat below the upper dead center position of the piston shown in FIG. 6. In this position the air is being compressed in the cylinder bore 17 so that further upward movement of the piston 3 results in compressing the air until its upper dead center position is reached as shown in FIG. 7; whereupon the compressed air is discharge via end 20 and end 21 and passageway 19 to the discharge port 16 aligned with the passageway end 21.

On the return stroke the piston 3 moves downwardly creating a partial vacuum in cylinder bore 17 and thereby causing a suction to provide a quick recharge by intake of air through the intake port 15 when the piston 3 reaches its bottom dead center position as shown in FIG. 5.

It is readily apparent from the foregoing that in accordance with the present invention, there has been provided a compressor which is capable of high speed operation while at the same time being of small compact size and of reduced weight. Moreover, the compressor is of very simple structure and as a result is economical to manufacture. Moreover, with the mounting stud arranged eccentric to the pulley shaft, the compressor also serves as a fan belt tightener.

Having now described the invention, what I claim as new and desire to secure by Letters Patent, is:

A reciprocating compressor for attachment to an engine and adapted to be belt driven by the engine and comprising a cylinder having a bore therein, a piston reciprocable in said bore and forming a compression chamber therein, intake and discharge means in said cylinder communicating with said bore and cooperating with said piston to effect an intake operation in said compression chamber when the piston is in the bottom dead center position and to effect a discharge operation from said compression chamber when the piston is in the upper dead center position, supporting means attached to the cylinder, shaft means on said supporting means, an engine belt-driven pulley and eccentric drive means on said shaft means, means connecting said eccentric drive means to said piston for reciprocating said piston in said bore in response to rotation of said pulley and eccentric drive means, a single stud on said supporting means in a position displaced from said pulley and extending parallel to the axis of said shaft for pivotally mounting the supporting means on the engine block, said stud being disposed laterally of a vertical line through the center of gravity of the compressor when the cylinder thereof is disposed axially parallel with said vertical line, whereby the weight of the compressor acting through the center of gravity pivots the supporting means about said stud to provide tension upon the belt.

References Cited in the file of this patent

UNITED STATES PATENTS

| | | |
|---|---|---|
| 1,382,018 | Schreiber | June 21, 1921 |
| 1,470,863 | Morse | Oct. 16, 1923 |
| 2,005,959 | Smith | June 25, 1935 |
| 2,963,217 | Wysong | Dec. 6, 1960 |
| 3,018,667 | Spietz | Jan. 30, 1962 |

FOREIGN PATENTS

| | | |
|---|---|---|
| 570,249 | Germany | Feb. 13, 1933 |
| 610,528 | France | June 12, 1926 |